United States Patent
Lin et al.

(10) Patent No.: US 9,369,311 B2
(45) Date of Patent: Jun. 14, 2016

(54) TRANSMISSION CIRCUIT FOR ETHERNET

(71) Applicant: NLightning Technology Ltd., New Taipei (TW)

(72) Inventors: Kun Tsen Lin, New Taipei (TW); Shih Peng Wu, New Taipei (TW)

(73) Assignee: NLIGHTNING TECHNOLOGY LTD., New Taipei (TW)

( * ) Notice: Subject to any disclaimer, the term of this patent is extended or adjusted under 35 U.S.C. 154(b) by 169 days.

(21) Appl. No.: 14/244,295

(22) Filed: Apr. 3, 2014

(65) Prior Publication Data

US 2015/0036251 A1 Feb. 5, 2015

(30) Foreign Application Priority Data

Jul. 31, 2013 (TW) .............................. 102127441 A

(51) Int. Cl.
*H02H 9/00* (2006.01)
*H04L 25/02* (2006.01)

(52) U.S. Cl.
CPC ........ *H04L 25/0278* (2013.01); *H04L 25/0264* (2013.01)

(58) Field of Classification Search
CPC ........ H02H 9/005; H02H 9/045; H04L 29/00; H04L 25/0264; H04L 25/0278
USPC ................................ 361/91.1, 111
See application file for complete search history.

(56) References Cited

U.S. PATENT DOCUMENTS

| | | | | |
|---|---|---|---|---|
| 4,695,916 A | * | 9/1987 | Satoh et al. | 361/56 |
| 5,077,543 A | * | 12/1991 | Carlile | 333/177 |
| 5,097,501 A | * | 3/1992 | Kutzavitch | 379/165 |
| 5,623,388 A | * | 4/1997 | Chaudhry | 361/119 |
| 6,195,245 B1 | * | 2/2001 | Kobsa | 361/120 |
| 6,377,434 B1 | * | 4/2002 | Martineau et al. | 361/119 |
| 6,900,705 B2 | * | 5/2005 | Nakamura et al. | 333/25 |
| 7,808,310 B2 | * | 10/2010 | Uzunov et al. | 327/557 |
| 2013/0265118 A1 | * | 10/2013 | Liu et al. | 333/131 |
| 2014/0009243 A1 | * | 1/2014 | Mo et al. | 333/100 |

FOREIGN PATENT DOCUMENTS

| | | | |
|---|---|---|---|
| JP | 3185034 | † | 7/2013 |
| TW | 367131 | † | 8/1999 |
| TW | M436860 U1 | † | 9/2012 |
| TW | M439205 U1 | † | 10/2012 |
| TW | M449299 U1 | † | 3/2013 |

\* cited by examiner
† cited by third party

*Primary Examiner* — Thienvu Tran
*Assistant Examiner* — Kevin J Comber
(74) *Attorney, Agent, or Firm* — McClure, Qualey & Rodack, LLP

(57) ABSTRACT

A transmission circuit including four transmission component sets for Ethernet is provided. For each of the transmission component sets, a first capacitor and a first inductor are cascaded, the first inductor is coupled to the Ethernet connector via the first transmission line (TL), the first capacitor is coupled to the Ethernet chip via the second TL; a second capacitor and a second inductor are cascaded, the second inductor is coupled to the Ethernet connector via the third TL, the second capacitor is coupled to the Ethernet chip via the fourth TL; a first component set is coupled between a first contact and a second contact, the first contact is located between the first capacitor and the first inductor, and the second contact is located between the second capacitor and the second inductor; and a second component set is coupled between the second TL and the fourth TL.

4 Claims, 9 Drawing Sheets

TRANSMISSION CIRCUIT FOR ETHERNET

This application claims the benefit of priority based on Taiwan Patent Application No. 102127441 filed on Jul. 31, 2013, which is hereby incorporated by reference in its entirety.

CROSS-REFERENCES TO RELATED APPLICATIONS

Not applicable.

BACKGROUND OF THE INVENTION

1. Field of the Invention

The present invention relates to a transmission circuit for Ethernet. More particularly, the transmission circuit of the present invention can replace the transformer of conventional Ethernet apparatuses to provide necessary signal coupling and direct current (DC) isolation in the Ethernet transmission. Moreover, part of the design of component sets in the transmission circuit of the present invention can further provide an additional surge protection function.

2. Descriptions of the Related Art

With the rapid development of network technologies, use of various Ethernet-related products has become very popular in people's daily life. However, for current Ethernet devices on the market, transformers used therein is manufactured manually, which leads to a rather high production cost. In addition, the Ethernet devices on the market do not have a surge protection function to prevent voltage surges generated by lightening strikes or static electricity in the environment or by switching on and off of the power source.

Accordingly, an urgent need exists in the art to provide a transmission circuit for Ethernet which can be manufactured by automatic production to replace the conventional transformer and to provide the surge protection function.

SUMMARY OF THE INVENTION

An objective of the present invention is to provide a transmission circuit for Ethernet which can be manufactured by automatic production to replace the conventional transformer.

To achieve the aforesaid objective, a transmission circuit for Ethernet is disclosed in the present invention. The transmission circuit comprises four transmission component sets.

Each of the transmission component sets is coupled between an Ethernet connector and an Ethernet chip. Each of the transmission component sets comprises a first capacitor, a second capacitor, a first inductor, a second inductor, a first transmission line, a second transmission line, a third transmission line, a fourth transmission line, a first component set and a second component set. For each of the transmission component sets: the first capacitor and the first inductor are cascaded and coupled between the first transmission line and the second transmission line, the first inductor is coupled to the Ethernet connector via the first transmission line and the first capacitor is coupled to the Ethernet chip via the second transmission line; the second capacitor and the second inductor are cascaded and coupled between the third transmission line and the fourth transmission line, the second inductor is coupled to the Ethernet connector via the third transmission line and the second capacitor is coupled to the Ethernet chip via the fourth transmission line; the first component set is coupled between a first contact and a second contact, the first contact is between the first capacitor and the first inductor, and the second contact is between the second capacitor and the second inductor; and the second component set is coupled between the second transmission line and the fourth transmission line.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The following embodiments are intended to illustrate the technical contents of the present invention but not to limit the scope of the present invention. It shall be appreciated that, in the following embodiments and the attached drawings, elements unrelated to the present invention are omitted from depiction; and dimensional relationships among individual elements in the following attached drawings are illustrated only for ease of understanding, but not to limit the actual scale.

Figure 1:
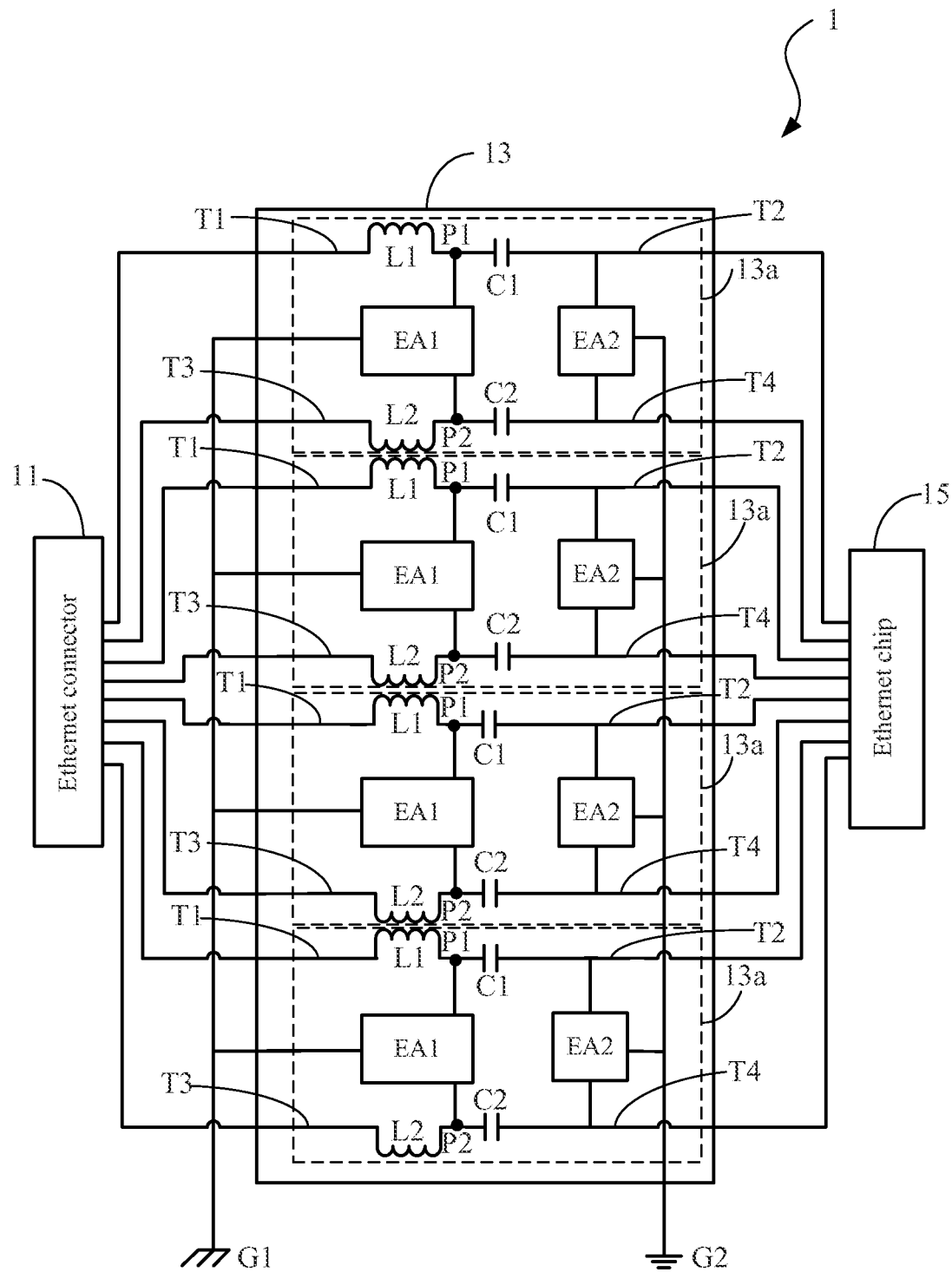
FIG. 1 is a schematic view of an Ethernet application circuit 1 of a first embodiment of the present invention.

A first embodiment of the present invention is shown in FIG. 1, which is a schematic view of an Ethernet application circuit 1 of the present invention. The Ethernet application circuit 1 comprises an Ethernet connector 11, a transmission circuit 13 and an Ethernet chip 15.

The Ethernet connector 11 may be an Ethernet connector having an RJ-45 interface, which includes a Tx0 +pin, a Tx0 −pin, a Tx1 +pin, a Tx1 −pin, a Tx2 +pin, a Tx2 −pin, a Tx3 +pin, and a Tx3 −pin. The Ethernet chip 15 may be a chip from any chip manufacturer, e.g., the RTL8201 chip from Realtek Semiconductor Corporation, which includes a MD0 +pin, a MD0 −pin, a MD1 +pin, a MD1 −pin, a MD2 +pin, a MD2 −pin, a MD3 +pin, and a MD3 −pin. Because the main technical contents of the present invention focus on the transmission circuit 13, and how the transmission circuit 13 of the present invention replaces the transformer of the conventional Ethernet application circuit and is coupled between the Ethernet connector 11 and the Ethernet chip 15 will be readily appreciated by those of ordinary skill in the art based on the following descriptions, the Ethernet connector 11 and the Ethernet chip 15 will not be further described herein.

The transmission circuit 13 comprises four transmission component sets 13a. Each of the transmission component sets 13a is coupled between the Ethernet connector 11 and the Ethernet chip 15. Each of the transmission component sets 13a comprises a first capacitor C1, a second capacitor C2, a first inductor L1, a second inductor L2, a first transmission line T1, a second transmission line T2, a third transmission line T3, a fourth transmission line T4, a first component set EA1 and a second component set EA2.

For each of the transmission component sets 13a: the first capacitor C1 and the first inductor L1 are cascaded and coupled between the first transmission line T1 and the second transmission line T2, the first inductor L1 is coupled to the Ethernet connector 11 via the first transmission line T1 and the first capacitor C1 is coupled to the Ethernet chip 15 via the second transmission line T2; the second capacitor C2 and the second inductor L2 are cascaded and coupled between the third transmission line T3 and the fourth transmission line T4, the second inductor L2 is coupled to the Ethernet connector 11 via the third transmission line T3 and the second capacitor C2 is coupled to the Ethernet chip 15 via the fourth transmission line T4; the first component set EA1 is coupled between a first contact P1 and a second contact P2, the first contact P1 is between the first capacitor C1 and the first inductor L1, and the second contact P2 is between the second capacitor C2 and the second inductor L2; and the second component set EA2 is coupled between the second transmission line T2 and the fourth transmission line T4.

Moreover, for each of the transmission component sets 13a: the first component set EA1 is further coupled to a first ground G1, and the second component set EA2 is further coupled to a second ground G2. It shall be appreciated that, the first ground G1 refers to the ground of the housing of the device (i.e., the external ground); however, the second ground G2 refers to the common ground (i.e., the internal ground), usually a voltage of which is 0 V.

The transmission circuit 13 may be implemented by coupling the first capacitor C1, the second capacitor C2, the first inductor L1, the second inductor L2, a first component set EA1 and a second component set EA2 on a printed circuit board (PCB) in the circuit connection way shown in FIG. 1 and leading out 24 pins from the PCB. Accordingly, the transmission circuit 13 can replace the transformer of the conventional Ethernet application circuit and be coupled between the Ethernet connector 11 and the Ethernet chip 15 to provide necessary signal coupling and DC isolation in the Ethernet transmission. The transmission circuit 13 may also be implemented by a process of integrating the capacitors and the inductors into one piece, for example, by adopting the co-fired ceramic technology. Moreover, the transmission circuit 13 may also be implemented by adopting a semiconductor process to form the capacitors and the inductors on a same Si substrate.

Figure 2A:
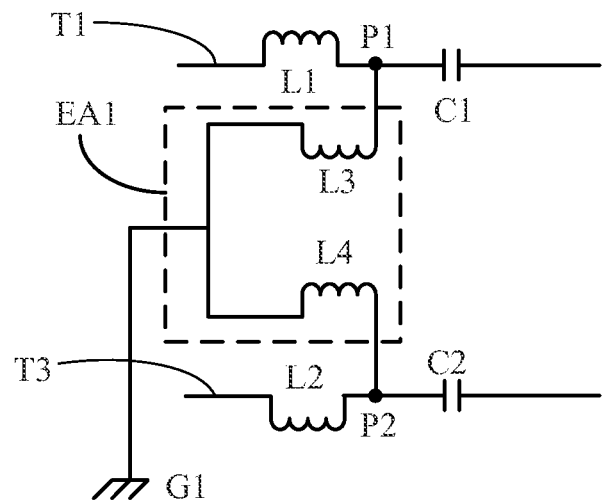
FIG. 2A to FIG. 2F are schematic views of a first component set EA1 for use in the Ethernet application circuit 1.

In an implementation, the first component set EA1 may be designed as shown in FIG. 2A to include a third inductor L3 and a fourth inductor L4. The third inductor L3 is coupled between the first contact P1 and the first ground G1, and the fourth inductor L4 is coupled between the second contact P2 and the first ground G1. The first capacitor C1 and the second capacitor C2 are each a non-polar capacitor which can provide the effects of signal coupling and DC isolation, and the first capacitor C1 and the second capacitor C2 each have a capacitance ranging between 5 nanofarad (nF) and 35 nF. Furthermore, the first inductor L1, the second inductor L2, the third inductor L3 and a fourth inductor L4 each have an inductance ranging between 5 microhenry (μH) and 35 μH. The first inductor L1, the second inductor L2, the third inductor L3 and the fourth inductor L4 can provide impedance matching at a specific frequency and provide a stable DC level. In addition, each of the first inductor L1 and the second inductor L2 may be a common mode chock with a common mode inductance ranging 5 μH and 35 μH or a common mode impedance ranging 120 ohm and 1000 ohm at 100 MHz.

Figure 2B:
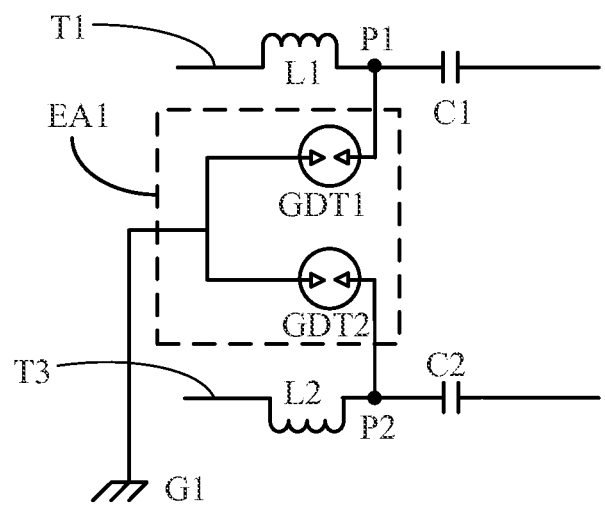
Figure 2C:
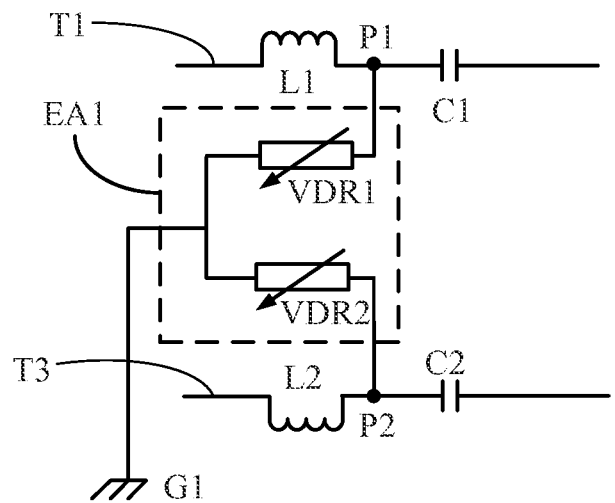
Figure 2D:
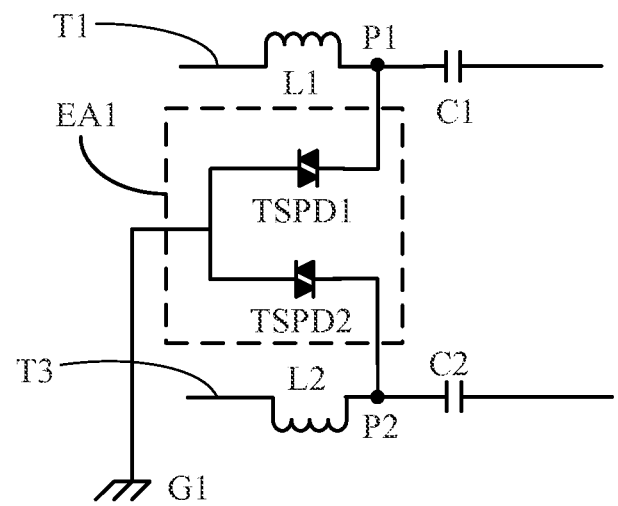

In another implementation, the first component set EA1 may be designed as shown in FIG. 2B to FIG. 2D to use components with switching or clamping characteristics so as to provide the surge protection function. In FIG. 2B, the first component set EA1 of each of the transmission component sets 13a comprises a first gas discharge tube GDT1 and a second gas discharge tube GDT2. The first gas discharge tube GDT1 is coupled between the first contact P1 and the first ground G1, and the second gas discharge tube GDT2 is coupled between the second contact P2 and the first ground G1. In FIG. 2C, the first component set EA1 of each of the transmission component sets 13a comprises a first voltage dependent resistor VDR1 and a second voltage dependent resistor VDR2. The first voltage dependent resistor VDR1 is coupled between the first contact P1 and the first ground G1, and the second voltage dependent resistor VDR2 is coupled between the second contact P2 and the first ground G1. In FIG. 2D, the first component set EA1 of each of the transmission component sets 13a comprises a first semiconductor discharging tube TSPD1 and a second semiconductor discharging tube TSPD2. The first semiconductor discharging tube TSPD1 is coupled between the first contact P1 and the first ground G1, and the second semiconductor discharging tube TSPD2 is coupled between the second contact P2 and the first ground G1.

Figure 2E:
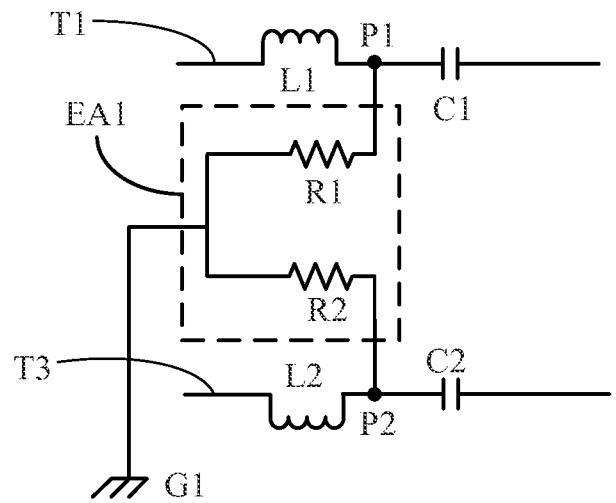
Figure 2F:
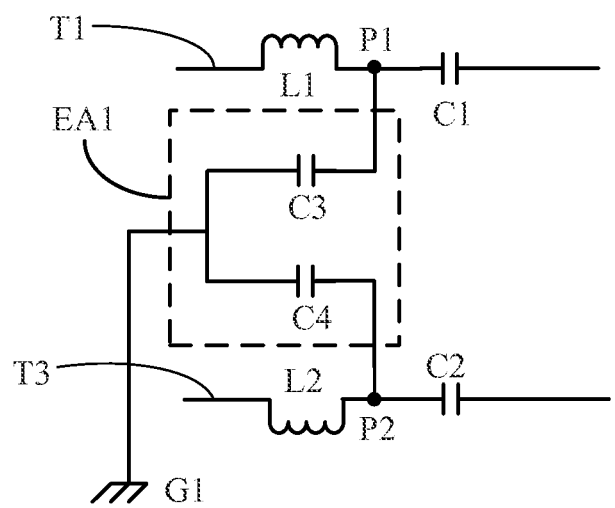

Additionally, in another implementation, the first component set EA1 may be designed as shown in FIG. 2E to FIG. 2F to provide impedance matching but without the surge protection function. In FIG. 2E, the first component set EA1 of each of the transmission component sets 13a comprises a first resistor R1 and a second resistor R2. The first resistor R1 is coupled between the first contact P1 and the first ground G1, and the second resistor R2 is coupled between the second contact P2 and the first ground G1. In FIG. 2F, the first component set EA1 of each of the transmission component sets 13a comprises a third capacitor C3 and a fourth capacitor C4. The third capacitor is coupled between the first contact P1 and the first ground G1, and the fourth capacitor C4 is coupled between the second contact P2 and the first ground G1.

Figure 3A:
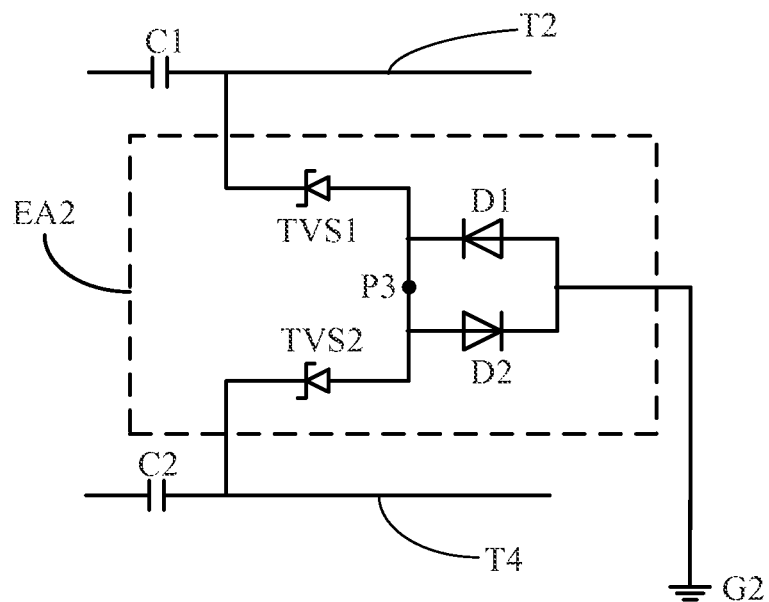
FIG. 3A to FIG. 3D are schematic views of a second component set EA2 for use in the Ethernet application circuit 1.
Figure 3B:
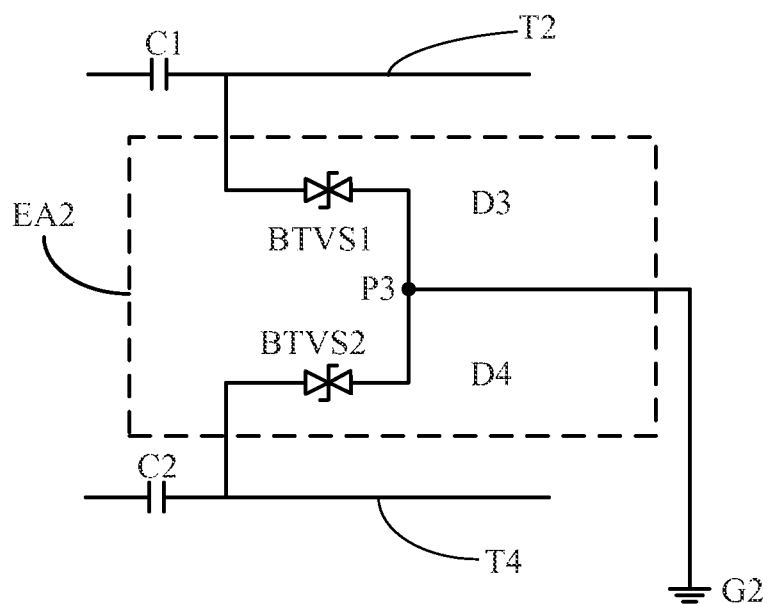
Figure 3C:
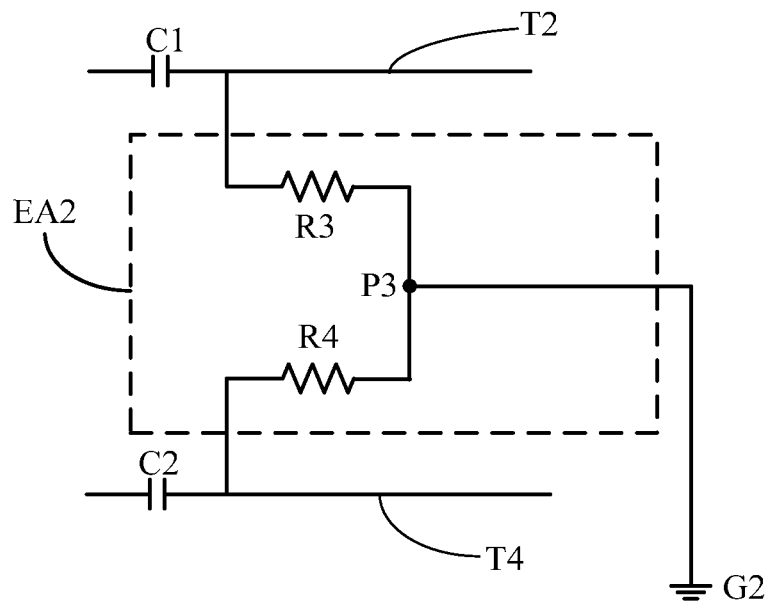

In another implementation, the second component set EA2 may be designed as shown in FIG. 3A to FIG. 3C to use components with switching or clamping characteristics so as to provide the surge protection function. In FIG. 3A, the second component set EA2 of each of the transmission component sets 13a comprises a first unidirectional transient voltage suppressor diode TVS1, a second unidirectional transient voltage suppressor diode TVS2, a first high-speed diode D1 and a second high-speed diode D2. The first unidirectional transient voltage suppressor diode TVS1 and the second unidirectional transient voltage suppressor diode TVS2 are inversely cascaded and coupled between the second transmission line T2 and the fourth transmission line T4. The first high-speed diode D1 and the second high-speed diode D2 are connected in anti-parallel and coupled between a second ground G2 and a third contact P3 located between the first unidirectional transient voltage suppressor diode TVS1 and the second unidirectional transient voltage suppressor diode TVS2.

In FIG. 3B, the second component set EA2 of each of the transmission component sets 13a comprises a first bidirectional transient voltage suppressor diode BTVS1 and a second bidirectional transient voltage suppressor diode BTVS2. The first bidirectional transient voltage suppressor diode BTVS1 and the second bidirectional transient voltage suppressor diode BTVS2 are cascaded and coupled between the second transmission line T2 and the fourth transmission line T4. The third contact P3 between the first bidirectional transient voltage suppressor diode BTVS1 and the second bidirectional transient voltage suppressor diode BTVS2 is coupled to the second ground G2.

Figure 3D:
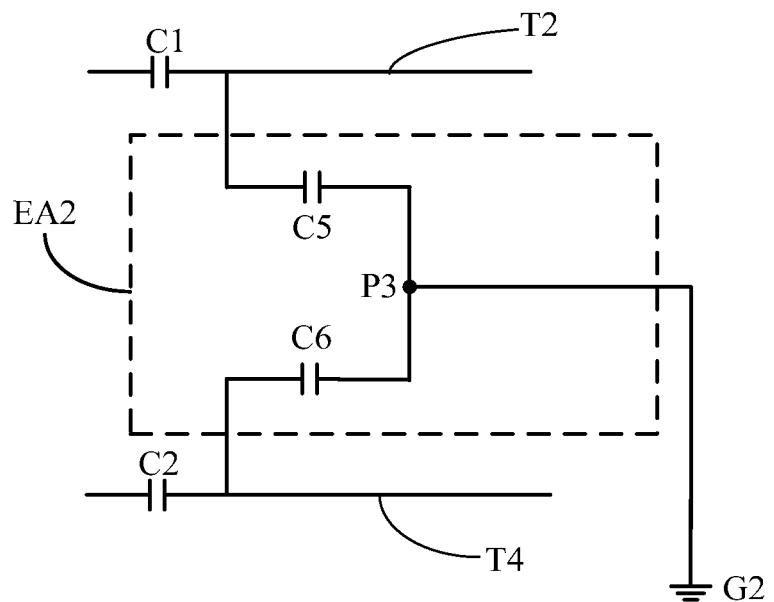

Additionally, in another implementation, the second component set EA2 may be designed as shown in FIG. 3C to FIG. 3D to provide impedance matching but without the surge protection function. In FIG. 3C, the second component set EA2 of each of the transmission component sets 13a comprises a third resistor R3 and a fourth resistor R4. The third resistor R3 and the fourth resistor R4 are cascaded and coupled between the second transmission line T2 and the fourth transmission line T4. The third contact P3 between the third resistor R3 and the fourth resistor R4 is coupled to the second ground G2. In FIG. 3D, the second component set EA2 of each of the transmission component sets 13a comprises a fifth capacitor C5 and a sixth capacitor C6. The fifth capacitor C5 and the sixth capacitor C6 are cascaded and coupled between the second transmission line T2 and the fourth transmission line T4. The third contact P3 between the fifth capacitor C5 and the sixth capacitor C6 is coupled to the second ground G2. The fifth capacitor C5 and the sixth capacitor C6 are each a non-polar capacitor and each have a capacitance ranging between 5 nF and 35 nF.

It shall be appreciated that, each of the transmission component sets 13a of the present invention may adopt any combination of one of the first component sets EA1 shown in FIG. 2A to FIG. 2F and one of the second component sets EA2 shown in FIG. 3A to FIG. 3D. When one of the first component sets EA1 shown in FIG. 2B to FIG. 2D and one of the second component sets EA2 shown in FIG. 3A to FIG. 3B are adopted, the transmission circuit 13 has the surge protection function.

Figure 4:
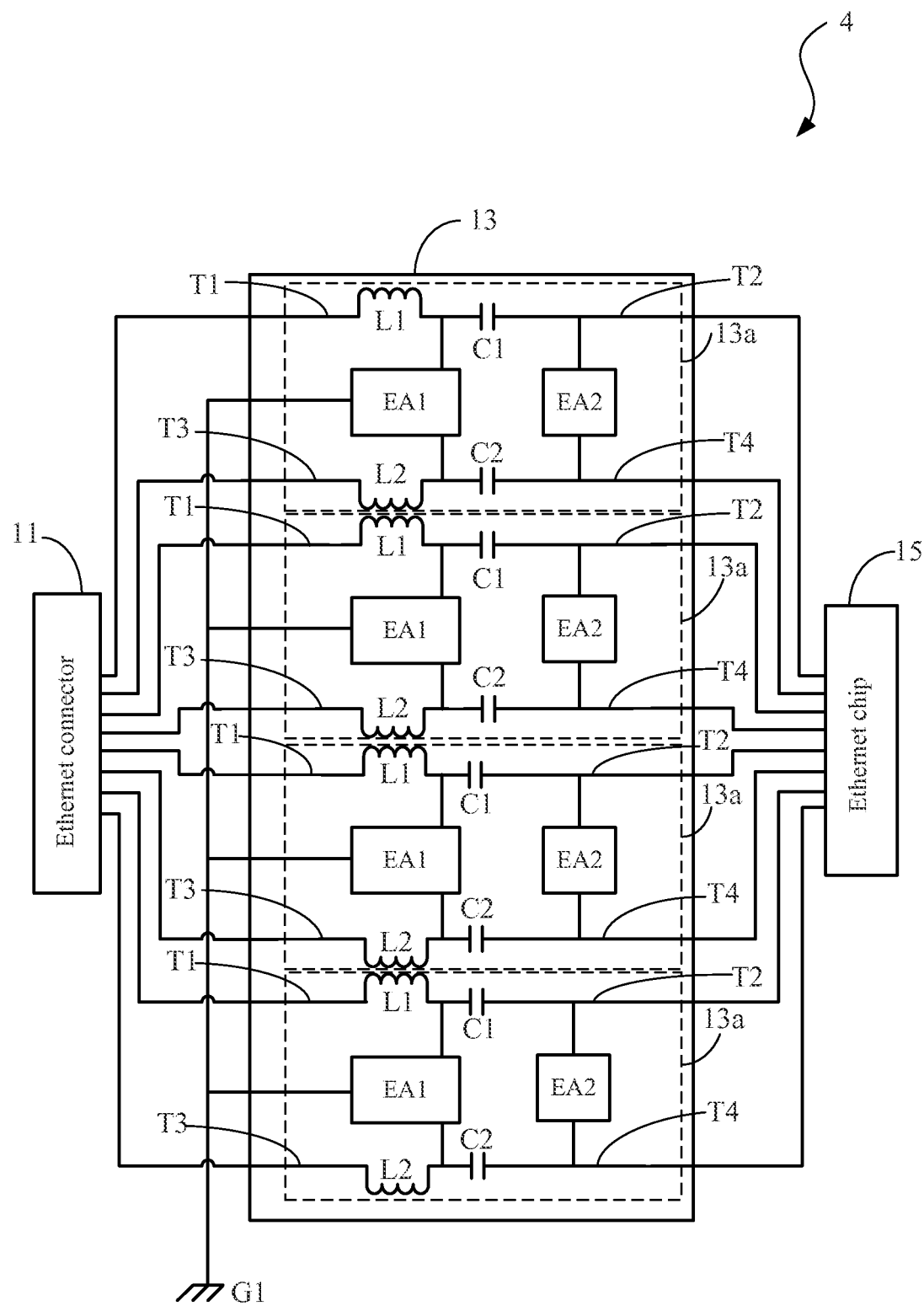
FIG. 4 is a schematic view of an Ethernet application circuit 4 of a second embodiment of the present invention.

A second embodiment of the present invention is as shown in FIG. 4, which is a schematic view of an Ethernet application circuit 4 of the present invention. The Ethernet application circuit 4 comprises an Ethernet connector 11, a transmission circuit 13 and an Ethernet chip 15. This embodiment differs from the first embodiment in that, it is unnecessary for the second component set EA2 of each of the transmission component sets 13a of the transmission circuit 13 to be coupled to the second ground G2.

In this embodiment, the transmission circuit 13 may be implemented by coupling the first capacitor C1, the second capacitor C2, the first inductor L1, the second inductor L2, a first component set EA1 and a second component set EA2 on a PCB in the circuit connection way shown in FIG. 4 and leading out 20 pins from the PCB. Accordingly, the transmission circuit 13 can replace the transformer of the conventional Ethernet application circuit and be coupled between the Ethernet connector 11 and the Ethernet chip 15 to provide necessary signal coupling and DC isolation in the Ethernet transmission. Similarly, the transmission circuit 13 may also be implemented by a process of integrating the capacitors and the inductors into one piece, for example, by adopting the co-fired ceramic technology. Moreover, the transmission circuit 13 may also be implemented by adopting a semiconductor process to form the capacitors and the inductors on a same Si substrate.

Figure 5A:
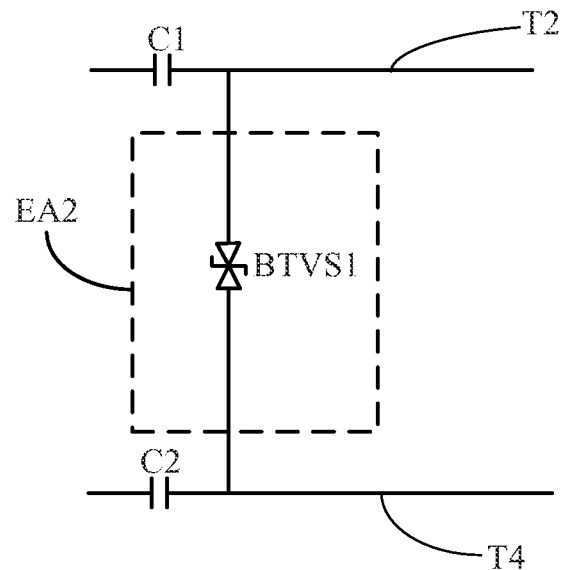
FIG. 5A to FIG. 5C are schematic views of a second component set EA2 for use in the Ethernet application circuit 4.
Figure 5B:
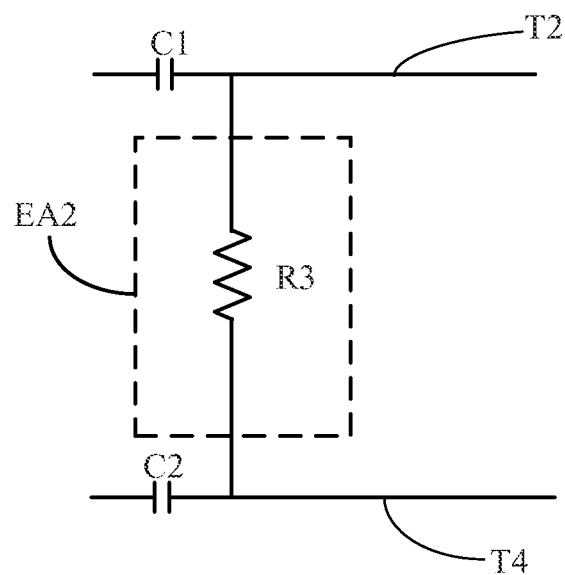
Figure 5C:
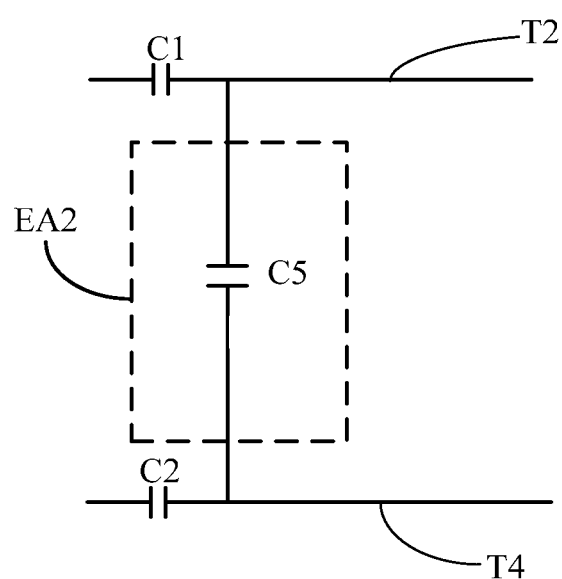

In an implementation, the second component set EA2 may be designed as shown in FIG. 5A to FIG. 5C to provide impedance matching but without the surge protection function. In FIG. 5A, the second component set EA2 of each of the transmission component sets 13a comprises a first bidirectional transient voltage suppressor diode BTVS1. The first bidirectional transient voltage suppressor diode BTVS1 is coupled between the second transmission line T2 and the fourth transmission line T4. In FIG. 5B, the second component set EA2 of each of the transmission component sets 13a comprises a third resistor R3. The third resistor R3 is coupled between the second transmission line T2 and the fourth transmission line T4. In FIG. 5C, the second component set EA2 of each of the transmission component sets 13a comprises a fifth capacitor C5. The fifth capacitor C5 is coupled between the second transmission line T2 and the fourth transmission line T4.

Similarly, each of the transmission component sets 13a of the present invention may adopt any combination of one of the first component sets EA1 shown in FIG. 2A to FIG. 2F and one of the second component sets EA2 shown in FIG. 5A to FIG. 5C. When one of the first component sets EA1 shown in FIG. 2B to FIG. 2D is adopted, the transmission circuit 13 has the surge protection function.

According to the above descriptions, as compared with the transformer of the conventional Ethernet devices, the transmission circuit of the present invention can be manufactured by automatic production so as to reduce the production cost. Furthermore, the transmission circuit of the present invention can provide necessary signal coupling and DC isolation in the Ethernet transmission and provide the surge protection function.

The above disclosure is related to the detailed technical contents and inventive features thereof People skilled in this field may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. A transmission circuit for Ethernet, comprising:
   four transmission component sets, each of the transmission component sets being coupled between an Ethernet connector and an Ethernet chip;
   wherein:
   each of the transmission component sets comprises a first capacitor, a second capacitor, a first inductor, a second inductor, a first transmission line, a second transmission line, a third transmission line, a fourth transmission line, a first component set a third inductor and a fourth inductor and a second component set, and for each of the transmission component sets:
   the first capacitor and the first inductor are cascaded and coupled between the first transmission line and the second transmission line, the first inductor is coupled to the Ethernet connector via the first transmission line and the first capacitor is coupled to the Ethernet chip via the second transmission line;
   the second capacitor and the second inductor are cascaded and coupled between the third transmission line and the fourth transmission line, the second inductor is coupled to the Ethernet connector via the third transmission line and the second capacitor is couple to the Ethernet chip via the fourth transmission line;
   the first component set is coupled between a first contact and a second contact, the first contact is between the first capacitor and the first inductor, and the second contact is between the second capacitor and the second inductor, the first component set is formed by a third inductor and a fourth inductor, the third inductor is directly coupled between the first contact and a first ground, and the fourth inductor is directly coupled between the second contact and the first ground; and
   the second component set is coupled between the second transmission line and the fourth transmission line, and the second component set is formed by a fifth capacitor coupled between the second transmission line and the fourth transmission line.

2. The transmission circuit as claimed in claim 1, wherein the first capacitor and the second capacitor are each a non-polar capacitor.

3. The transmission circuit as claimed in claim 2, wherein the first capacitor and the second capacitor each have a capacitance ranging between 5 nanofarad (nF) and 35 nF.

4. The transmission circuit as claimed in claim 1, wherein the first inductor, the second inductor, the third inductor and the fourth inductor each have an inductance ranging between 5 microhenry (μH) and 35 μH.

\* \* \* \* \*